(12) United States Patent
Lloyd

(10) Patent No.: US 7,693,418 B2
(45) Date of Patent: Apr. 6, 2010

(54) CAMERA ACCESSORY MOUNT USING SHOULDER STRAP LOOP

(76) Inventor: Russell Brent Lloyd, 26174 Moonglow Dr., Middleton, ID (US) 83644

( * ) Notice: Subject to any disclaimer, the term of this patent is extended or adjusted under 35 U.S.C. 154(b) by 390 days.

(21) Appl. No.: 11/890,457

(22) Filed: Aug. 6, 2007

(65) Prior Publication Data

US 2009/0041453 A1 Feb. 12, 2009

(51) Int. Cl.
*G03B 11/00* (2006.01)
(52) U.S. Cl. .................. 396/544; 396/422; 248/690
(58) Field of Classification Search .............. 396/419, 396/422, 544; 248/229.16, 231.81, 689, 248/690, 691; 224/603, 620, 626, 671, 615, 224/616, 901.8, 908
See application file for complete search history.

(56) References Cited

U.S. PATENT DOCUMENTS

| | | | | |
|---|---|---|---|---|
| 2,723,430 A | * | 11/1955 | Paillard | 24/369 |
| 5,585,151 A | * | 12/1996 | Bruning | 428/31 |
| 7,472,881 B2 | * | 1/2009 | Arakawa | 248/690 |

* cited by examiner

*Primary Examiner*—W. B. Perkey
*Assistant Examiner*—Linda B Smith

(57) ABSTRACT

This invention discloses a system to attach various photographic accessories to a camera by using an apparatus that attaches to the existing shoulder strap loop of a camera. The apparatus has a body, a strong hook to attach to the shoulder strap loop, and a thumbscrew that tightens the apparatus to the camera. The apparatus also incorporates an additional shoulder strap loop to replace the one covered when this system is used. Various mounting plates then attach to the body of the apparatus to which the various accessories are mounted.

7 Claims, 4 Drawing Sheets

CAMERA ACCESSORY MOUNT USING SHOULDER STRAP LOOP

TECHNICAL FIELD

The present invention relates to photographic equipment, and accessories.

CITED PATENTS

U.S. Pat. No. 4,794,414 Universal Camera Actuator Bracket December 1988 Kozina et al.
U.S. Pat. No. 5,160,955 Shutter Actuating Apparatus November 1992 Nihls et al.
U.S. Pat. No. 4,081,814 Camera Flash Bracket March 1978 Bulland

BACKGROUND

Since the invention of the camera there have been numerous accessories created to help photographers improve their photographs. These accessories range from a simple cable release to complex filters and flash equipment. Many brackets and mounts have been devised to help attach accessories to cameras. This invention details a new accessory mounting system that utilizes the shoulder strap loop existing on most modern cameras.

The idea for this invention was conceived after I purchased a new digital SLR camera. The new cameras today do not have provisions for using the old-fashioned mechanical cable release. They have infrared remote controls or an electrical connector for using a remote switch. In researching methods for using a cable release on cameras that do not have the threaded receiver for the cable release I found several methods to adapt a cable release.

In one known technique suggested in U.S. Pat. No. 4,794,414 a plate is secured to the tripod screw on the bottom of the camera and the plate is bent around to the top of the camera. The cable release is mounted to the plate just above the shutter release button. Some drawbacks with this technique are that it is bulky, it monopolizes the tripod mounting screw, and it interferes with the operation of other functions of the camera.

In another known technique for adapting a cable release to a camera a shell was built around the entire camera. For example, U.S. Pat. No. 5,471,272 describes such a technique. This method also is bulky and interferes with other functions of the camera.

My invention describes an apparatus that attaches to the shoulder strap loop of a camera. The apparatus serves as a universal accessory mount to which a myriad of accessories can be mounted to the camera. One accessory would be a cable release adaptor as described above.

The apparatus could also be used to mount an external flash to the camera similarly to that described in U.S. Pat. No. 4,081,814, but without having to use such a bulky handle.

The shoulder strap loop is an ideal place to mount accessories because it is usually a strong metal loop that is an integral part of the camera body. It is very rigid and strong and sets up high on the camera where most of the accessories are used.

SUMMARY

The object of this invention is to provide a stable and strong mounting system for mounting accessories to a camera using the cameras shoulder strap loop. Most modern cameras are built with very strong metal loops that accommodate the shoulder strap. This loop is a strong integral part of the camera body and thus is an ideal place to secure this invention. This invention will facilitate the mounting of accessories to the camera body and not sacrifice usability. In fact, the use of this invention creates a post like extension near the shutter release of a camera that fits comfortably between the photographer's thumb and forefinger. It actually improves the grip and usability of the camera.

This invention takes up much less space than the mounts and brackets that currently are used to mount accessories. It can remain on the camera even when no accessories are mounted to it and will not interfere with the usability or function of the camera.

DETAILED DESCRIPTION

Reference will now be made in detail to some embodiments of the invention, examples of which are illustrated in the accompanying drawings.

Figure 1:
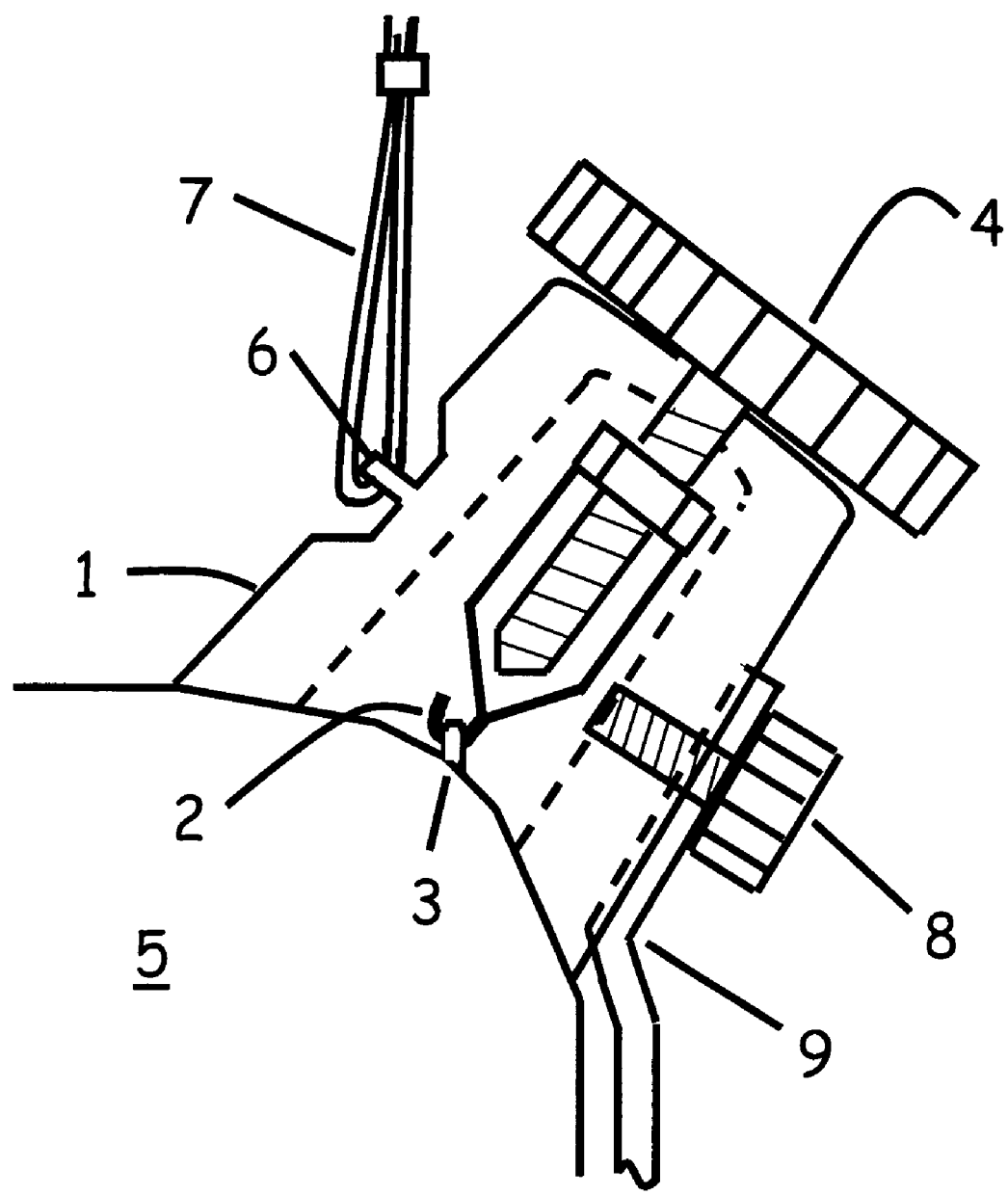
FIG. 1 is a cross section view of the apparatus that attaches to the existing camera strap loop.

FIG. 1 is a cross section view of the apparatus that attaches to the existing camera strap loop. The invention has three main components; the body 1 which gives it its structural strength, a strong hook 2 with which the invention attaches to the shoulder strap loop 3, and a thumbscrew 4 which tightens and secures the invention to the camera 5.

The body is made of a strong metal, rigid plastic, or another material such that it provides enough strength to support the weight of the camera or accessory it will support. The bottom of the body which contacts the camera is molded to fit the shape of the camera around the area of the shoulder strap loop. This will prevent shifting or a loose fit when the thumbscrew is tightened. The addition of a rubber coating or washer on the bottom of the body will further protect the camera surface. The body is hollow inside to allow room for the hook and thumbscrew to operate.

The top of the body has a hole for the thumbscrew to attach to the hook inside the body.

The apparatus is installed by loosening the thumbscrew which allows the hook to protrude from the bottom of the body. Place the hook under the shoulder strap loop on the camera. Tighten the thumbscrew which draws the hook back up into the body. This action will secure the body to the camera.

Referring to the apparatus in the installed position the upper side of the body is either notched or can be molded to form a shoulder strap loop 6. This is done so that a shoulder strap 7 can still be used since this apparatus covers the shoulder strap loop that existed on the camera.

On the other side of the body is a second threaded thumb screw 8 that serves as the mounting screw for the accessories. It is made so that it receives various mounting plates 9 and holds them securely. The mounting plates can be keyed so that no twisting or rotating occurs once the thumbscrew is tightened.

The mounting plates are manufactured to accommodate the accessory being mounted.

When attached to the camera the invention provides a strong and stable mounting system for many accessories.

Although some embodiments of the present invention have been described in connection with certain specific embodiments for instructional purposes, the present invention is not limited thereto.

Figure 2:
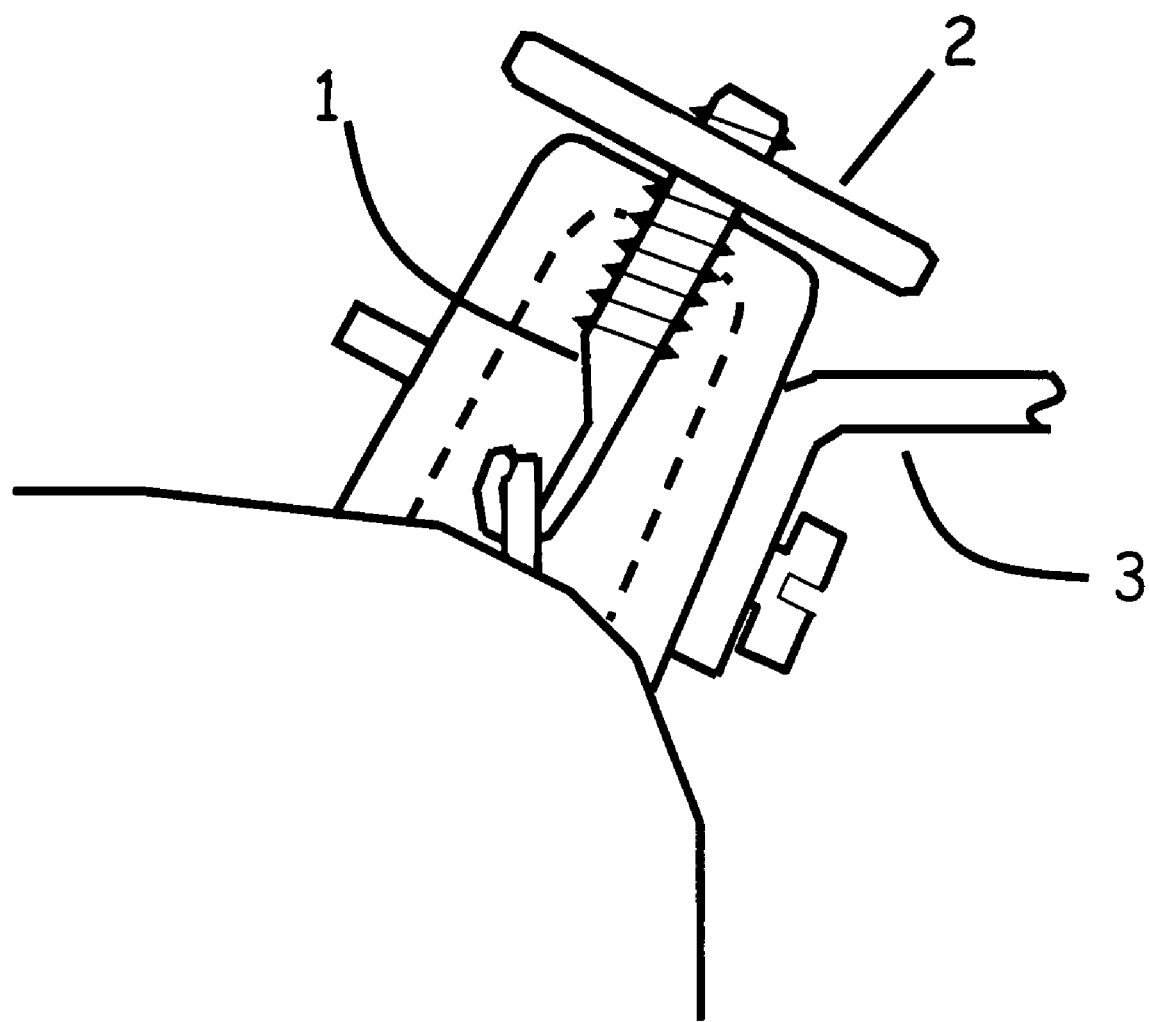
FIG. 2 is the same view but with an alternate method of attaching the apparatus.

For example, FIG. 2 shows an alternate embodiment where the hook is attached to a screw 1 that extends through the top of the body and a large knurled nut 2 is used to tighten the body to the camera. An alternate embodiment of the mounting plate 3 is also shown. Accordingly, various modifications, adaptations, and combinations of various features of the described embodiments can be practiced without departing from the scope of the invention as set forth in the claims.

Figure 3:
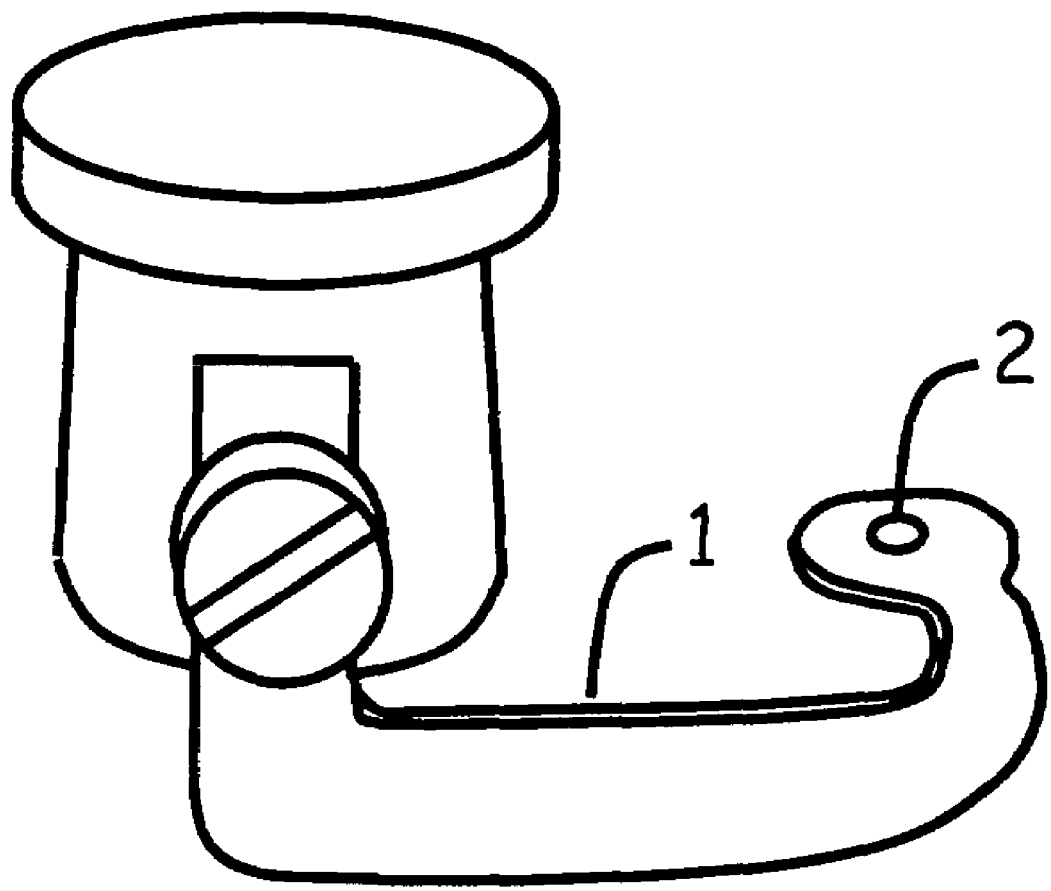
FIG. 3 is a perspective view of the main apparatus with a mechanical cable release adapter plate.

FIG. 3 discloses a mounting plate 1 used to attach a cable release to the camera. The mounting plate is manufactured to the form of a specific camera model. It attaches to the body of the apparatus via the smaller thumbscrew. It extends downward and forward then bends upward until it covers the shutter release button. The mechanical cable release then attaches to threads 2 in the mounting plate just above the shutter release button.

Figure 4:
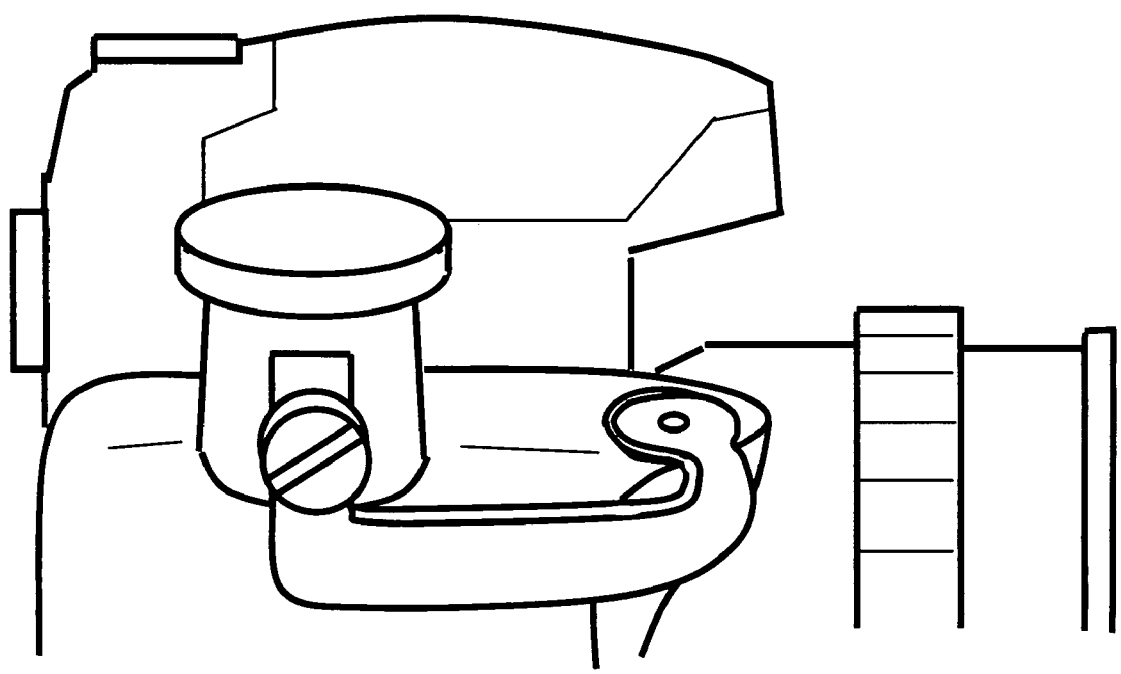
FIG. 4 is a perspective view of the invention with a cable release adaptor mounted to a camera.

FIG. 4 shows the cable release mounting plate described above connected to a camera.

This invention also applies to any conceived accessory mounted to the camera using this apparatus. This invention is shown in only one of its forms, and is not thus limited but is susceptible to various changes and modifications without departing from the spirit and scope of the invention.

What is claimed is:

1. A system of mounting accessories to a camera using an apparatus that attaches to the shoulder strap loop on a camera, the apparatus comprising:

a base;
   a hook to engage the shoulder strap loop;
   a thumb screw, or nut, that when tightened, secures the apparatus to the camera.

2. The apparatus of claim 1, further comprising:
   a shoulder strap loop incorporated on the base to allow the use of a shoulder strap when the apparatus is in use.

3. The apparatus of claim 1, further comprising:
   the base with the bottom surface contoured with the same shape as the camera to form a tight fit.

4. The apparatus of claim 1, further comprising:
   a rubberized base or washer where the base contacts the camera to protect the surface of the camera.

5. The apparatus of claim 1, further comprising:
   a threaded screw mechanism wherein customized mounting plates are attached to the apparatus.

6. The apparatus of claim 1, further comprising:
   a key mechanism to prevent the mounting plate from rotating or moving once installed.

7. The system of claim 1, wherein any of the following accessories are mounted to the apparatus via mounting plates:
   a. Cable release adapter
   b. Telescope mount
   c. External flash mount
   d. Multiple cameras mounted to same tripod
   e. Wrist strap
   f. Photographic umbrella or bounce diffuser
   g. A clamp to allow camera to be secured to other stationary objects.

\* \* \* \* \*